Sept. 13, 1927.
T. ROSENBAUM
1,642,087
DIRECTION INDICATOR FOR MOVING BODIES
Filed July 15, 1924
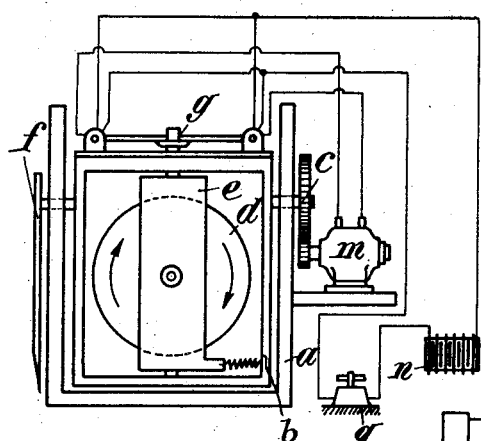
Fig. 1
Fig. 2
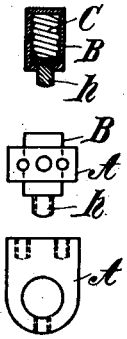
Fig. 3
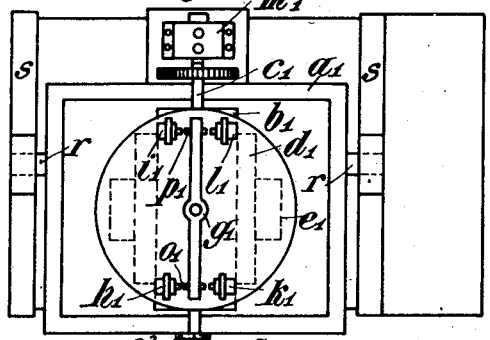
Fig. 6
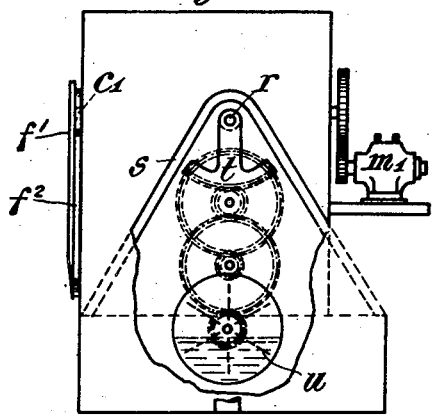
Fig. 4
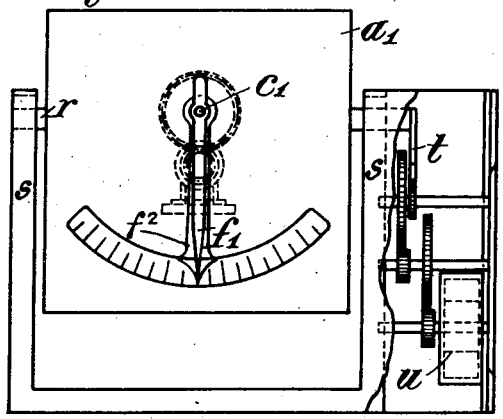
Fig. 5
*Inventor:*
T. Rosenbaum
By Marks & Clerk
Attys.

Patented Sept. 13, 1927.

1,642,087

UNITED STATES PATENT OFFICE.

THEODOR ROSENBAUM, OF BERLIN, GERMANY; SELMA ROSENBAUM AND ILSE ANNA MATHILDE ROSENBAUM, SOLE HEIRS OF SAID THEODOR ROSENBAUM, DECEASED, ASSIGNORS TO GYRORECTOR GESELLSCHAFT MIT BESCHRANKTER HAFTUNG, OF BERLIN, GERMANY.

DIRECTION INDICATOR FOR MOVING BODIES.

Application filed July 15, 1924, Serial No. 726,228, and in Germany July 13, 1923.

This invention relates to improvements in direction and curve indicators for moving bodies, such as aircraft and the like, comprising a gyroscope rotating in a vertical plane and in which the indicator is provided in the known manner with an indicating device, and the support of the gyroscope is mounted in a frame rotatable about a horizontal axis.

The invention has for its object to reduce in such an indicator the amplitude of oscillations of the vertical direction indicator about its horizontal axis by utilizing the precession movements of the gyroscope about its vertical axis for operating electric contacts by means of which an electric reversible motor engaging with the vertical rectangular frame is driven in one or the other direction, according to the direction of precessional rotation, and thus is put in a position at once to counteract any impulses acting on the vertical direction indicator.

Such a device however—for reasons which will be explained later on—presents the disadvantage that after curved flights which are performed with the machine longitudinally inclined, the vertical direction indicator is forced by the electric motor to deviate from its correct position. To avoid that, according to the invention provision is made whereby the vertical direction indicator, is free to move relatively to the horizontal transverse axis of the system with the object of avoiding incorrect positions after such curved flights. Moreover according to the invention the indicator can be given, by shifting its centre of gravity, an oblique position in the vertical longitudinal plane of the machine, owing to which deviations from the course caused in any way, can be ascertained from the indications given by the indicator, and exactly corrected.

Relay devices based on the principle of a reversible motor, have already been repeatedly used for stabilizing gyroscopes. The reversible electric motor according to the invention differs from known devices by the special object for which it is intended, and by its action. The working of the reversible motor used in the invention is that, firstly, the electromagnetic excitation of the motor is definitely fixed by the precessions which the gyroscope makes relatively to the system on which it is mounted with its precession spindle, and secondly, that the motor imparts to the system suspended like a true pendulum, the property of swinging at once into the position of equilibrium without oscillating about the second position, that is to say as the pendulum approaches the said position of equilibrium the motion becomes slower instead of faster as in an ordinary pendulum. As regards the special object for which the reversible motor is intended, it is, as already stated, to increase the accuracy of the indications of a gyroscopic apparatus acting as a plumb line.

Two constructions according to the invention are illustrated by way of example in the accompany drawing in which Figure 1 shows the first construction in side elevation, Figure 2 the contact and current supply device in plan, Figure 3 the resilient arrangement of the contact pins and Figures 4—6 the second construction in side elevation, from elevation and plan.

$a$ is the support of the rectangular frame $b$, $c$ the horizontal spindle, on which the frame $b$ is pivoted in the support $a$, so that the pending spindle $c$ is substantially parallel with the longitudinal axis of the actuated member or the direction in which it moves. $d$ the gyroscope, $e$ the gyroscope support pivoted in the frame $b$ for precession about the vertical axis and $f$ the pointer mounted on the spindle $c$. Above the frame $b$ to the gyroscope support $e$ is attached a lever $g$ which together with the gyroscope $d$ travels to and fro between the contact pins $h$, $i$, $k$, and $l$ (Figure 2) and in that way supplies current to the motor $m$ from the source of current $n$ through the contact pins $o$ and $p$ with which it is provided. The supply of current is effected in such a manner that, according to the direction of the precession motion, the motor $m$ is driven in one or in the other direction. The contact pin $h$ is shown in Figure 3 by way of example on an enlarged scale with its guide tube B fitted into its bearing block A, and with the helical spring C acting in the said tube as a buffer, in order to better show the resilient arrangement of the contact pins. On the left of the current generator $n$ is shown a switch $q$ by means of which the supply of current to the contact pins $h$, $i$, $k$ and $l$ can be cut off.

Corresponding letters primed refer to similar parts in Figs. 4–6 as in Figs. 1 and 2. The support $a^1$ is freely mounted in an outer support $s$ by means of a spindle $r$ so that the second pending axis or spindle $r$ of the frame $a$ is parallel with the transverse axis of the actuated member. To the spring $r$ is connected a toothed wheel segment $t$ which transmits at a high ratio the movements of the support $a^1$ to the paddle wheel $u$ which is enclosed in a drum filled with glycerine or some other damping liquid.

The effect of the motor is as follows. The gyroscope $d$, in counteracting the impulses acting on its spindle $c$ by precessions about its vertical axis and thereby in bringing the contact pins $o$ and $p$ either against the contacts $h$ and $l$ or the contacts $k$ and $i$, closes the circuit leading from the generator $n$ to the motor, now in one and now in another direction of current, and in that way releases a counter-impulse equal to the primary impulse. As soon as the counter impulse has reached the value of the primary impulse, the gyroscope $d$ must again swing back and thus release the contacts closed by it. The principle of the arrangements made is therefore that the gyroscope counteracts the impulses acting on it, not by gyrostatic pressures, that is to say not by continuously increasing precessions but merely by controlling the motor.

The gyroscope acts in consequence of a rotary moment about the axis $c$ by an advanced movement or precession about the vertical axis $g$, and this advance movement or precession closes both contacts $i$, $k$ or $h$, $l$, and thereby actuates the auxiliary motor $m$ which counteracts the first mentioned moment about the axis $c$. The instrument shows the lateral inclination, namely the rolling angle and not the rolling movement, relative to a true perpendicular line by means of the gyroscope which is suspended like a pendulum; it further shows the lateral inclination relative to the seemingly perpendicular line by means of a pendulum. Since the true and the seemingly perpendicular lines differ substantially from each other in the turning movements, the straddle, or angle of division, of the two perpendicular lines offers a measure for the rate of speed in turning a secondary effect.

In order to make clear the advantage offered by the provision of a new degree of freedom obtained by the arrangement of the spindle $r$, it is first necessary to consider the following:

When that transverse plane of the gyroscope device which is determined, on the one hand, by the gyroscope axis, and on the other hand by the precession axis of the gyroscope, is exactly perpendicular, which in the construction shown in Figure 5 is attained by the mobility of the support $a^1$ to the spindle $r$ even in the case of longitudinal inclination of the aircraft, the gyroscope plane also must always remain vertical owing to the arrangements made, without being affected by the longitudinal inclinations of the machine and by its movements in curves. If however on the contrary the support $a^1$ is given an angular elevation of 90° to the spindle $r$, so that the precession axis of the gyroscope is directed horizontally, then in the case of a curved flight of the aircraft, the indicator $f^1$ which is now also horizontal, must be held fast in its given position, and therefore after a curved flight of the angle $a$, deviate from the direction of the true vertical line to the extent of the same angle $\alpha$ when the support $a^1$ is again brought back to its vertical position. The consequence therefore must be that with an elevation position of the support $a^1$ of an angle $\beta$, the vertical position indicator $f^1$ will be forced by a curved flight of the angle $\alpha$ to deviate from the perpendicular line.

This gives the possibility of correcting in a simple manner deviations from the course. If opposite the vertical direction indicator $f^1$ a pendulum is placed freely movable about the spindle $c^1$, the angular elevation provided will make it possible to ensure that any deviation from the course would result in a "scissors" position of the two direction indicators, which position will remain until the machine has been brought back to its correct course. Thus deviations from the horizontal direction can be corrected even without a compass.

The next utilization of the degree of freedom given to the support $a^1$ relatively to the spindle $r$, would be that the tendency to deviate expressed by the angle $\alpha \sin \beta$ would be completely eliminated by giving the support $a^1$ an exactly vertical suspension by a suitable arrangement of the centre of gravity.

Having now particularly described and ascertained the nature of my said invention and in what manner the same is to be performed, I declare that what I claim is:—

1. In a direction and curve indicator for moving bodies, a gyroscope, a frame rotatable about a horizontal axis, a support for the gyroscope rotatable about a vertical axis in the frame, a circuit, a source of electromotive force interposed in the circuit, a reversible electric motor connected with the frame and interposed in the circuit, and coacting circuit controlling means in said circuit including groups of contact elements carried respectively by the frame and support.

2. In a direction and curve indicator for moving bodies, a gyroscope, a support, means for mounting the support for rotation about a horizontal axis, a frame, means for mounting the frame in said support for rotating about a horizontal axis which is at right angles to the support axis, a second support for the gyroscope rotatable about the vertical axis in the said frame, a motor on the support connected to oscillate the said frame, a circuit, a source of electro-motive force interposed in the circuit, and a pole changing device for the motor in said circuit including groups of contacting elements carried respectively by the frame and the second named support.

3. A direction and curve indicator for moving bodies including a gyroscope, a support means for mounting the support for rotation about a horizontal axis, a frame, means for mounting the frame in said support for rotation about a horizontal axis which is at right angles to the support axis said frame being pendulously mounted, a pendulum freely swinging about the last-named axis, a second support for the gyroscope rotatable about the vertical axis in the frame, a motor on the support connected to oscillate said frame about its axis, a circuit for said motor, a source of electromotive force interposed in the circuit, and motor controlling means in the circuit including groups of contacting elements carried respectively by the frame and the second named support to be closed by relative movement therebetween.

4. A direction and curve indicator as claimed in claim 1, wherein a second named support is provided for the frame and is movable about a horizontal axis at right angles to the frame axis so that deviations of the vertical direction indicator are avoided even when the machine describes curves in longitudinally oblique position.

In testimony whereof I hereunto affix my signature.

THEODOR ROSENBAUM.